United States Patent
Shenefiel et al.

(10) Patent No.: US 9,509,720 B2
(45) Date of Patent: Nov. 29, 2016

(54) TECHNIQUES FOR IMPROVED RUN TIME TRUSTWORTHINESS

(71) Applicant: Cisco Technology, Inc., San Jose, CA (US)

(72) Inventors: Chris A. Shenefiel, Oakton, VA (US); Rafael Mantilla Montalvo, Raleigh, NC (US); Roy M. Brooks, New Hill, NC (US)

(73) Assignee: Cisco Technology, Inc., San Jose, CA (US)

( * ) Notice: Subject to any disclaimer, the term of this patent is extended or adjusted under 35 U.S.C. 154(b) by 232 days.

(21) Appl. No.: 14/302,681

(22) Filed: Jun. 12, 2014

(65) Prior Publication Data

US 2015/0365436 A1    Dec. 17, 2015

(51) Int. Cl.
*H04L 29/06* (2006.01)
*G06F 21/50* (2013.01)
*H04L 9/08* (2006.01)

(52) U.S. Cl.
CPC .............. *H04L 63/20* (2013.01); *G06F 21/50* (2013.01); *H04L 9/088* (2013.01); *H04L 63/10* (2013.01); *H04L 63/102* (2013.01); *H04L 63/123* (2013.01); *H04L 63/1433* (2013.01); *H04L 63/126* (2013.01)

(58) Field of Classification Search
CPC ........ G06F 21/50; G06F 21/53; G06F 21/57; G06F 21/62; H04L 9/0877; H04L 9/088; H04L 9/3234; H04L 9/3236
See application file for complete search history.

(56) References Cited

U.S. PATENT DOCUMENTS

| 6,128,656 | A | 10/2000 | Matchefts et al. |
|---|---|---|---|
| 7,979,854 | B1 | 7/2011 | Barole et al. |
| 8,458,765 | B2 | 6/2013 | Aciicmez et al. |
| 8,621,202 | B2 | 12/2013 | Mukherjee |
| 2009/0169017 | A1* | 7/2009 | Smith ............... G06F 21/57 380/278 |
| 2011/0302400 | A1 | 12/2011 | Maino et al. |
| 2012/0303941 | A1 | 11/2012 | Grieco et al. |
| 2013/0091345 | A1 | 4/2013 | Shroff et al. |
| 2014/0181984 | A1* | 6/2014 | Kundu ............ G06F 17/30129 726/26 |

OTHER PUBLICATIONS

James Greene, Intel Corporation, "Intel® Trusted Execution Technology," White Paper, retrieved from http://www.intel.com/content/www/us/en/trusted-execution-technology/trusted-execution-technology-security-paper.html, on Jun. 12, 2014, 8 pages.

(Continued)

*Primary Examiner* — Edward Zee
(74) *Attorney, Agent, or Firm* — Edell, Shapiro & Finnan, LLC

(57) ABSTRACT

Techniques are presented herein for attesting the trustworthiness of devices in a secure network during run-time operation. A security management device is configured to perform network trust attestation operations in order to generate an access control policy that defines access rights for a device in a network. The access control policy is assured by creating a hash value for the access control policy and then signing the hash value to generate a signed hash value. The signed hash value is integrated with the access control policy, and the access control policy is sent with the signed hash value to the operator device for verification.

20 Claims, 5 Drawing Sheets

(56) References Cited

OTHER PUBLICATIONS

Cavium, "NITROX III Family of Security Processors," Product Brief, retrieved from http://www.cavium.com/pdfFiles/Nitrox_III_PB_Rev1.0.pdf?x=4, on Jun. 12, 2014, 2 pages.

Ramia, et al., "RC6 Implementation including key scheduling using FPGA," ECE 646 Project, Dec. 2006, pp. 1-10.

Freescale, "Secure Boot for QorIQ Communications Processors," White Paper, www.freescale.com, Jan. 25, 2013, 4 pages.

* cited by examiner

TECHNIQUES FOR IMPROVED RUN TIME TRUSTWORTHINESS

TECHNICAL FIELD

The present disclosure relates to trusted networking.

BACKGROUND

A secure/trustworthy network may be comprised of one or more network devices configured to provide services to computing devices external to the network. For example, a computing device external to the secure network may request services from one or more devices within the secure network. However, before the external computing device accesses the services provided by a device within the secure network, the external computing device may need to attest (e.g., verify) that the device is a trustworthy device in the secure network. Upon verifying that the device is trustworthy, the external device can access services provided by the device in the secure network.

DESCRIPTION OF EXAMPLE EMBODIMENTS

Overview

Techniques are presented herein for attesting the trustworthiness of devices in a secure network during run time (run-time) operation. A security management device is configured to perform network trust attestation operations in order to generate an access control policy that defines access rights for a device in a network. The access control policy is assured by creating a hash value for the access control policy and then signing the hash value to generate a signed hash value. The signed hash value is integrated with the access control policy, and the access control policy is sent with the signed hash value to the operator device for verification.

Example Embodiments

Figure 1:
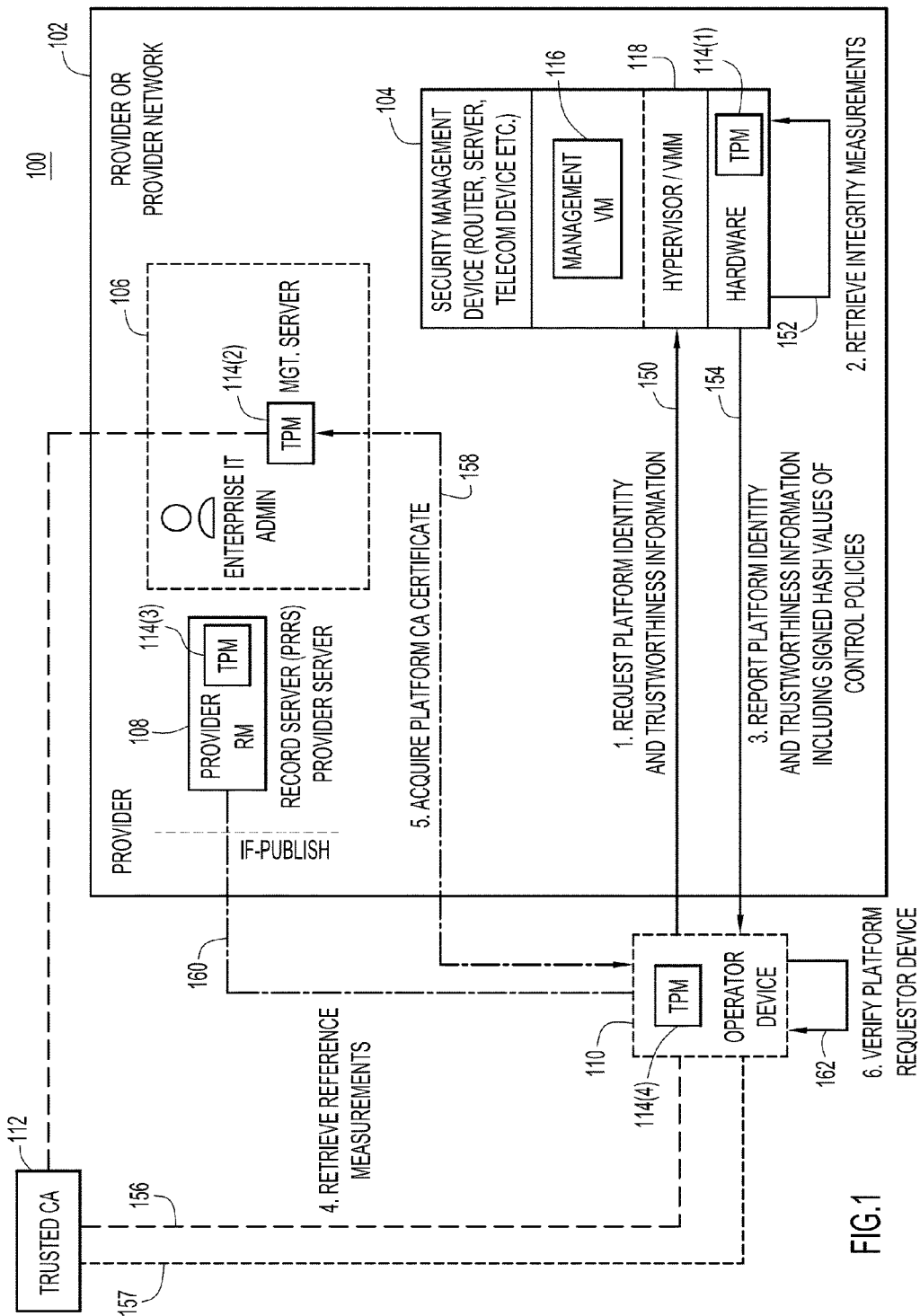
FIG. 1 is a system diagram of a secure network and a device external to the secure network that verifies run time trustworthiness of a device within the secure network, according to an example embodiment.

The techniques presented herein relate to attesting network devices, i.e., verifying the trustworthiness of network devices. Specifically, the techniques presented herein enable devices external to a secure network to attest the trustworthiness of devices within the secure network during run-time based on information provided by the devices in the secure network. An example system topology ("system") is shown at reference numeral 100 in FIG. 1. System 100 comprises a secure network, shown at reference numeral 102. The secure network 102 may also be referred to as a "provider" or "provider network" since one or more network devices in the secure network 102 may be configured to provide services to devices external to the secure network 102. In FIG. 1, the secure network 102 includes a security management device 104, a management server 106 and a provider server 108. The system 100 also has a device 110 external to the secure network 102. The device 110 may also be referred to as an "operator device." The device 110 is in communication with a (Trusted) certificate authority (CA) 112, with the provider server 108 and with the management server 106. The CA validates the management server 106, provider server 108, security management device 104 and operator device 110 certificates. The certificates are used for mutual authentication enabling trusted communications.

The security management device 104 is a computing device that is configured with a Trusted Platform Module (TPM). The TPM is shown at reference numeral 114(1) in the security management device 104. The TPM 114(1) is an anti-tamper technology protected chip that provides secure storage for attestation information (e.g., hash of bootup code) as described herein. For example, the TPM 114(1) may be implemented in hardware or software, and in general, may comprise an input/output unit, a memory component and key generation modules. The security management device 104 is also configured to host a plurality of virtual machines (VMs), and thus, the security management device 104 is provisioned with a management VM 116 that manages communications between VMs and a hypervisor or "virtual machine manager" (VMM) 118 to control and manage operations of VMs (e.g., to control VM migration, VM instantiation, VM removal, etc.). The management VM 116 and the VMM 118 may be embodied by software components executed on the security management device 104.

The management server 106 is a network device that is configured to administer the secure network 102. The security management device 104 and the provider server 108 register with the management server 106 through an authentication process. The management server 106 is also registered with trusted third party Certificate Authority (CA) 112 and issues certificates, which certificates assert that devices in the secure network 102 are trusted to establish communications. This operation is part of the Identity Registration process that unambiguously identifies a platform to acknowledge its trustworthiness. The management server 106 and the operator 110 are registered with the Trusted CA 112. This means that the identity certificate presented by the trusted devices to the operator 110 (signed by the management server) can be verified. As shown in FIG. 1, the management server 106 is provisioned with TPM 114(2) that is similar to TPM 114(1) of the security management device 104. For example, the TPM 114(2) stores boot code hash values for the management server in the secure network 102.

The provider server 108 is a network device that is configured to send authenticity information (e.g., expected hash values) to the operator device 110. For example, as described herein, the provider server 108 may send expected hash values to the device 110 to enable the device 110 to verify that the security management device 104 is trustworthy. As shown in FIG. 1, the provider server 108 is provisioned with a TPM 114(3) that is similar to TPM 114(1) of the security management device 104. For example, the TPM 114(3) stores boot code hash values for the provider server in the secure network 102.

The provider server 108 is a network device that is configured to store information pertaining to the services provided by the secure network 102. It collects the raw integrity measurements, hash values for software components, serial numbers for hardware components, manufacturer identification, etc. Vendors who are authoritative sources of these measurements provide the signed hash values for software and hardware in the form of a Reference Manifest (RM). The management server 106 provides the signed policies hash values to the provider server 108, since it is the administrator who designs and applies the policies according with the provider device profile. The provider server 108 stores these measurements in a Reference Manifest (RM) database according to a TCG Integrity Schema. The provider server 108 is also known as the Provider Reference Manager (RM) Record Server (PRRS) and is configured to collect all integrity data for components of the secure network 102. The PRRS may collect and publish the integrity data (using, as shown in FIG. 1, an Interface Publish (IF-Publish) standard).

The device 110 in FIG. 1 is a computing device that is requesting access to use resources (e.g., services) provided by one or more devices in the secure network 102. For example, the device 110 may be requesting services provided by the security management device 104 or another device in the secure network 102. Since the device 110 is requesting services from one or more devices in the secure network 102, the device 110 will often authenticate that it is communicating with a trustworthy platform. For example, when the device 110 is requesting services from the security management device 104, the device 110 will attest the trustworthiness of the security management device 104. As described by the techniques herein, the device 110 is able to perform this attestation during run-time operation. The device 110 may receive attestation information from the security management device 104. The operator device stores at boot time the bootup code measurements in a local TPM, shown at reference numeral 114(4).

In one example, the secure network 102 is a Trusted Computing Group (TCG) system. In general, a TCG system is a standards specific system with specifications and technology used for trusted computing platforms. Though the techniques described herein may be applicable to other secure networks, for simplicity and ease of explanation, the secure network 102 in FIG. 1 is described hereinafter as a TCG system.

The TCG system is a trustworthy system that enables devices (and users of devices) external to the system to access resources and services that are hosted by devices within the TCG system. Thus, devices in the TCG system are referred to as "provider" devices, and devices outside of the TCG system are referred to as "requestor" devices. TCG systems are used for securing information assets (e.g., services) provided by devices within the system. For example, provider devices can provide services to requestor device securely and confidentially, upon proper verification by the requestor devices. As stated above, a requestor device (e.g., device 110) may request services from a provider device (e.g. the security management device 104), and as a part of the request, the requestor device may authenticate that the provider device is trustworthy. This attestation process provides an assurance to the requestor device that it is communicating with an authenticated system and that information is not leaked between devices in the secure network 102.

Typically, as a provider device joins the secure network 102 and initializes (e.g., "boots"), the provider device executes one or more program codes and generates one or more associated hash values. For example, the provider device may boot up, execute program code and measure hash values that are associated with the execution of the program code during boot-up. The hash values are stored on the TPM 114(1) (e.g., in a Program Configuration Register (PCR)), and the signed hash values will ultimately be sent by the provider device to a requestor device to enable the requestor device to verify the authenticity of the provider device. In one example, the requestor device verifies the authenticity of the provider device by comparing the signed hash value received from the provider device with an expected hash value (obtained, e.g., from the provider server 108 in the secure network 102). If there is a match, the requestor device determines that the provider device is trustworthy, and if there is not a match, the requestor device determines that the provider device is not trustworthy. The provider device expected hash value is digitally signed by the provider server 108 and published in the form of a Reference Manifest (RM) as defined by TCG.

However, according to existing attestation techniques, a requestor device that boots signed images in the secure network 102 is trustworthy only to the point at which the operating system is brought online. In other words, the above described assertion techniques are effective for determining the trustworthiness of the provider device using hash values generated at the time that it joins the secure network 102 and boots up. However, at a later time (minutes, days, months later), the provider device may no longer be trustworthy. At this point, any code that is executed by the provider device could compromise the entire system. This is particularly true in a multi-tenant computing environment with a plurality of virtual machines hosted by the provider device. The hash value assertion techniques described above, however, only validate the hash values generated at the time of boot up, and these techniques do not provide any attestation information during run-time, after the provider device has joined the secure network.

The techniques described herein alleviate these drawbacks by extending boot time measurement and attestation processes to assess run-time trustworthiness of devices in a system. For example, as described by the techniques herein, access control policies may be sent by the provider device to a requestor device during run-time of the provider device, and these access control policies may be signed hash values generated by the provider device at attestation time. The requestor device can use the signed hash values to verify the authenticity of the provider device, and additionally, receives information about the scope of services it is able to request from the secure network 102 as defined by the access control policies.

An example of a run-time attestation process is shown in FIG. 1. At reference numeral 150, the requestor device (device 110) requests identity and trustworthiness information from the security management device 104. The identity and trustworthiness information request may contain, for example, a request for signed policy hash values generated by the security management device 104. The signed hash values may be hash values generated by the security management device 104 during boot-up or during a subsequent code execution during run-time. The management server 106 controls the launch of new virtual machines and the installations of policies according to the profile of the provider device. The signed policy hash is also installed in the provider server 108 to be used as reference during the attestation process. The provider server 108 holds the expected has values for the policy and compares that with the run-time report received from the management device 104. During profiling, the administrator creates these expected policies for the device before installation of new software. This includes the policy hash and the expected public key signature.

The hash values of the policies are also calculated and signed by the security management device 104 at the time of an attestation request. This is the run-time and dynamic aspects of the technique. At 152, the provider device retrieves the boot-up code signed hash value information from its TPM (TPM 114(1)) and at 154 sends to the requestor device identity information comprising the hash value information of the requestor device along with signed hash values of the access control policy information. The policies hash values are dynamically calculated and signed at attestation request by the security management device 104, which is in a run-time state. As stated above, the access control policy information may include information that defines a scope of service requests allowed for the requestor device. At 156, the requestor device sends the certificate information received from the security management (104) device to the certificate authority 112 to verify that the certificate is valid. The result of the certificate validation by the CA 112 is returned at 157. It should be appreciated that the certificate authority 112 may be stored on a network device and be accessible by the requestor device and the management server 106 in the secure network 102. At 160, the provider server 108 sends to the operator device 110 a RM containing the expected hash values. The requestor device thus has information of the expected hash value and the actual hash value (sent by the provider device in operation 154). At 162, the requestor verifies the hash value previously received from the provider device (in operation 154), and upon verification, the requestor device determines the provider device trustworthiness. The requestor device can also report the trustworthiness of the security management device 104 to another network entity (not shown in FIG. 1). These techniques are described in further detail hereinafter.

Figure 2:
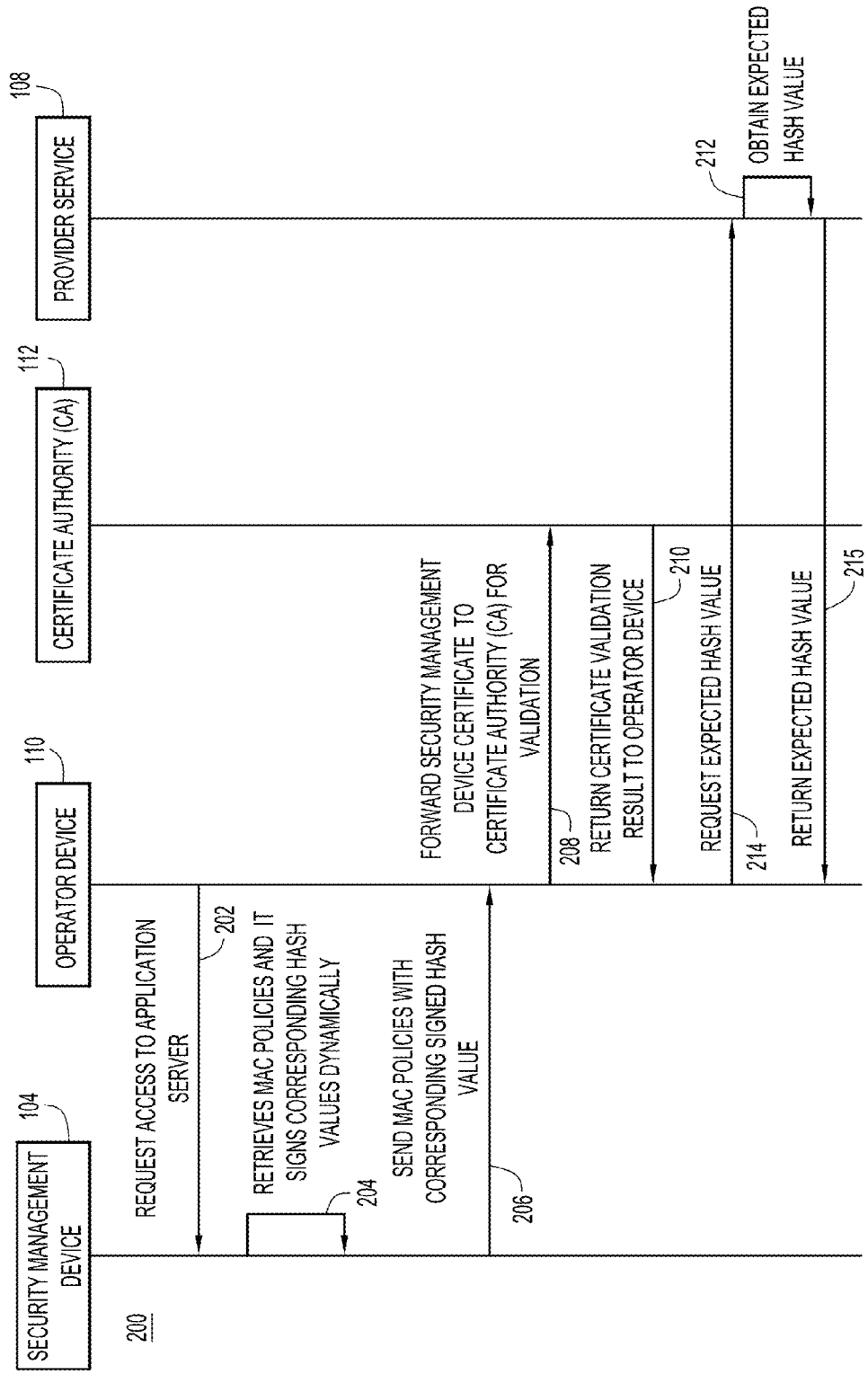
FIG. 2 is a ladder diagram depicting messages exchanged between devices in the system to verify the run time trustworthiness of a device within the secure network, according to an example embodiment.

Reference is now made to FIG. 2. FIG. 2 shows an example ladder diagram 200 depicting messages exchanged between devices in the system 100 for attestation during run-time as a requestor device requests access to an application in the secure network. For example, in FIG. 2, the requestor device is device 110. The requestor device is requesting access for an application hosted by one or more devices in the secure network 102. FIG. 2 shows messages that are exchanged to enable the device 110 to perform run-time attestation before accessing the application. At reference numeral 202, in FIG. 2, the device 110 sends to the security management device 104 a request to access an application hosted by the security management device 104. In response to receiving the request, at reference numeral 204, in FIG. 2, the security management device 104 retrieves the active Mandatory Access Control (MAC) policies destined for the device 110. It calculates and signs the policies hash values dynamically. In general, MAC policies are periodically sent to requestor devices during run-time. Such policies are applied to constrain process executions allowed for devices external to a secure network. MAC policies enable the security management device 104 to monitor behavior of requestor devices and to log any attempted policy violations. For example, when the device 110 receives a MAC policy from the security management device 104, the MAC policy may contain information that defines the scope of access rights between objects (processes, files, network interfaces, etc.) for the device 110. If the device attempts to obtain access rights beyond those specified in the MAC policy for predetermined number of instances, the device 110 may be flagged by the security management device 104 as a potentially malicious device. It should be appreciated that any access policy may be used, and the MAC policy is simply an example.

The MAC policy hash values are signed by the security management device 104 (e.g., generated during boot-up of the security management device 104, static, during run-time, dynamic, etc.) as described in connection with FIG. 1, above. By signing the MAC policy hash value, the security management device 104 maps system events and security with the MAC policy to report the run-time level of trustworthiness of a system, virtual machine or even a specific process within the secure network 102. Static MAC policies could be measured and stored in the TPM 114(1) of the security management device 104 at boot time, thus providing additional cryptographic assurance of the policies installed and configured in the system. Additionally, the MAC policy may be scored with a trust assurance value. The trust assurance score value may indicate a percentage of trust assurance. The trust assurance score value is assigned by the operator device 110 during the attestation process. The score value is a measured of the trustworthiness of the security management device 104 based on, for example, version of the code supported (which may indicate the vulnerability of the code if there are code patches pending), and the active policy profile for the type of application that is being requested.

After the security management device 104 generates the signed MAC policy hash, the security management device 104, at 206, sends to the device 110 the signed MAC policy hash and certificates. The signed MAC policy hash, as described above, describes the access rights permitted for access by the device 110. The signed MAC policy has the hash value and certificates. At reference numeral 208, the device 110 forwards the certificate in the signed MAC policy to the certificate authority (CA) 112 for validation. At reference numeral 210 the certificate authority 112, at 210 sends the certificate validation result to the operator device 110. Upon receiving the hash value request from the operator device 110, the provider server 108, at reference numeral 214, requests the expected hash value associated with the security management device 104 to the provider server 108. At reference numeral 212, the provider server obtains the expected hash values. The provider server 108, in general, can determine the expected hash value since it is a member of the secure network 102. The security management device 104 is able to create a report of the running policy which can be hashed and signed upon request at run-time. This report is generated using a standard MAC policy utility and is reported by the running kernel. The hashing and signing is handled by a separate process after the kernel outputs the report. The management device does not know what the expected hash values are. Expected has values are known by the provider Server.

At operation 215, the provider server 108 returns the expected hash value to the operator device 110, and upon receiving expected hash value, the device 110 can evaluate the hash value and the trust assurance value in the original MAC policy to determine whether or not the security management device 104 is trustworthy determining a trust assurance score value. Thus, as shown in FIG. 2, MAC policies generated by the security management device 104 may be generated and signed for attestation information (e.g., the hash values and certificates). Since MAC policies are delivered to requestor devices periodically during run-time operations, these signed MAC policies can be used by a requestor device (e.g., device 110) to attest the trustworthiness of the security management device.

Figure 3:
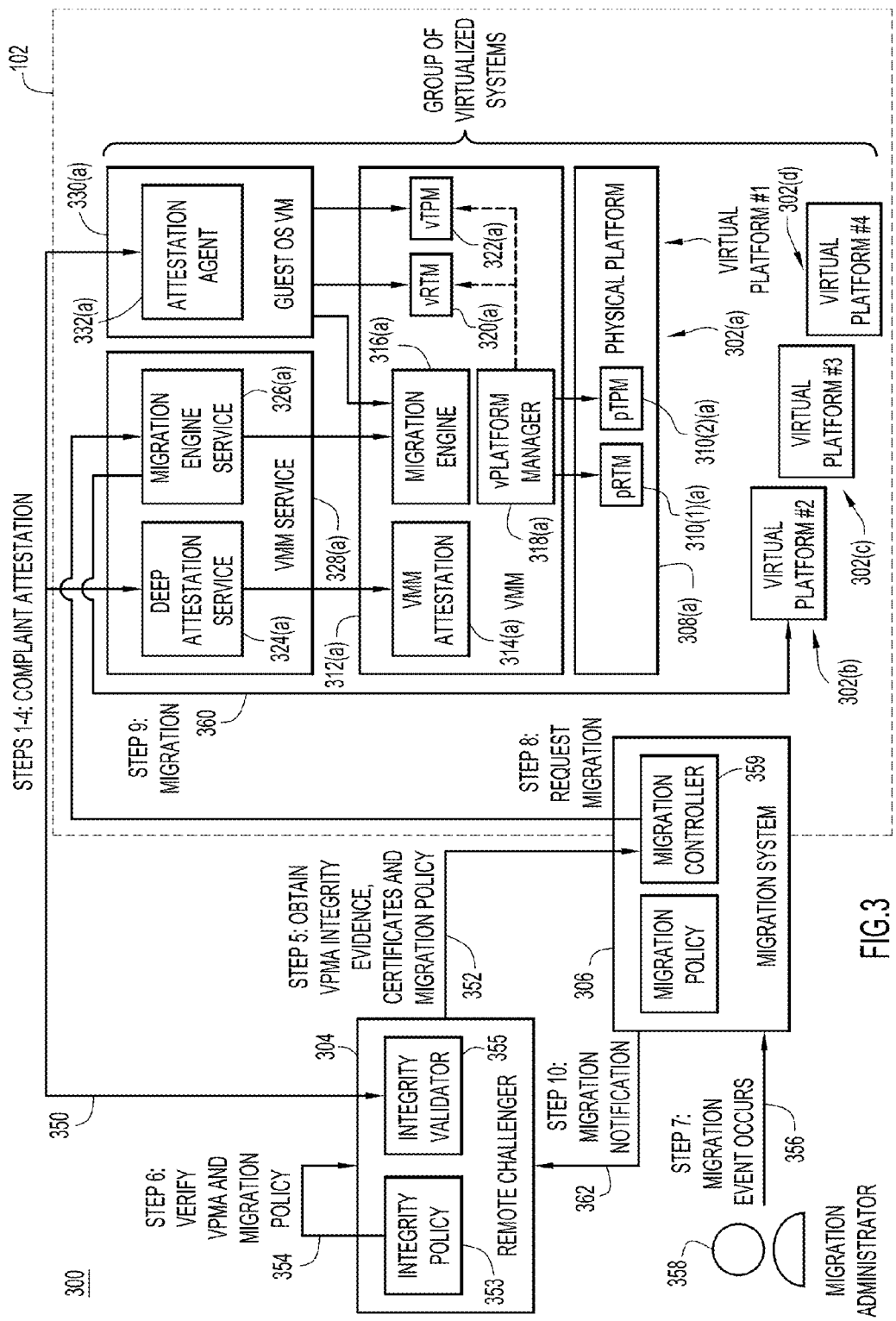
FIG. 3 is a system diagram of a secure network with a plurality of devices and virtual machines and a device external to the secure network that verifies run-time trustworthiness of the virtualized systems to control the migration of virtual machines, according to an example embodiment.

Reference is now made to FIG. 3. FIG. 3 shows an example system diagram 300 depicting attestation of virtual machines during migration. The system 300 in FIG. 3 shows a plurality of network devices 302(a)-302(d). Each of the network devices 302(a)-302(d) resides in a secure network (e.g., secure network 102 described above). The system 300 also comprises a remote challenger device ("remote challenger") 304, which may be a requestor device such as device 110 described in connection with FIG. 1, above. FIG. 3 also shows a migration system 306, which may be stored in a device accessible by the remote challenger device 304 and the network devices 302(a)-302(d).

As stated above, the network devices 302(a)-302(d) in FIG. 3 reside in a secure network (e.g., secure network 102 described in FIG. 1). The components of network device 302(a) are now described, though it should be appreciated that these components are also present in network devices 302(b)-302(c). For simplicity, only the components of network device 302(a) are shown in FIG. 3 and described herein. Network device 302(a) has a physical platform, shown at 308(a). The physical platform 308(a) has memory components comprising physical TPM (pTPM) units (similar to TPM 114(1) described in connection with FIG. 1, above) and physical Root of Trust for Measurement (pRTM). The pRTM for network device 302(a) is shown at 310(1)(a). It should be appreciated that other pRTM and pTPM components are present in network devices 302(b)-302(d). The Root of Trust for Measurement is the component measuring the boot-up code and extending the hash values into the TPM PCRs.

Network device 302(a) also has a plurality of virtual devices. These virtual devices, for example, are hosted by the network device 302(a) and may be stored as executable programs in memory components of the network device 302(a). As shown in FIG. 3, network device 302(a) has a VMM 312(a) that is configured to control and manage operations of VMs (e.g., to control VM migration, VM instantiation, VM removal, etc.). The VMM 312(a) is similar to VMM 118, described in connection with FIG. 1, above. In network device 302(a), the VMM 312(a) comprises a VMM attestation module 314(a), a migration engine 316(a), a virtual platform (vPlatform) manager 318(a), a virtual RTM (vRTM) 320(a) and a virtual TPM (vTPM) 322(a). Network device 302(a) also has a deep attestation service module 324(a) and a migration engine service module 326(a), which are part of a VMM service module 328(a). Additionally, network device 302(a) has a guest VM operating system 330(a) comprising an attestation agent 332(a).

In FIG. 3, the remote challenger 304 (e.g., the device 110 described in connection with FIG. 1 and FIG. 2, above) is attesting the trustworthiness of a virtual machine before it migrates from network device 302(a) to network device 302(b). In FIG. 3, reference numeral 350 shows the initial operations for information exchanged between the remote challenger 304 and the network device 302(a) for attestation of the trustworthiness of a virtual machine hosted by the network device 302(a). These initial operations are similar to operations 150, 152, 154 and 156 described in connection with FIG. 1, above. For example, reference numeral 350 represents the remote challenger 304 requesting from the network device 302(a) identity information and trustworthiness information from a virtual machine hosted by the network device 302(a). In response to requesting the identity and trustworthiness information, the VMM attestation module 314(a) provides to the remote challenger 304 an access policy with a signed hash value associated with the virtual machine as well as the VM signed measured values stored in the vTPM at launch time. The trustworthiness information, including the access policy, received by the remote challenger 304 is shared with the Migration System 306 which orchestrates with the Migration Engine Services 326(a) the VM migration. The VM migration is performed if the destination network device has the same access policy profile as the source. In addition, geo-location information is obtained from the pTPM in the network devices.

At 352, the remote challenger 304 obtains from an integrity policy database 353 migration policy information (e.g., including Virtual Platform Migration Attestation (VPMA) information). The remote challenger 304 verifies that the migration attestation and the migration policies do not conflict. The integrity policy database 353 may be stored in or accessible by the remote challenger 304. The migration policy information comprises integrity evidence pertaining to the virtual machine for which the remote challenger 304 is attesting trustworthiness. At 354, the remote challenger 304 verifies (e.g., via an integrity validator unit 355) the trustworthiness of the information provided to it by the network device 302(a) in operation 350. Upon such verification, the remote challenger 304 is assured that the virtual machine hosted by the network device 302(a) is trustworthy.

At operation 356 in FIG. 3, a migration administrator 358 initiates a migration event for the virtual machine that the remote challenger 304 has attested. For example, the migration administrator 308 (an individual or device) may determine that the virtual machine is to migrate to network device 302(b) (e.g., to be hosted by network device 302(b)). The migration system 306 receives the migration instructions from the migration administrator 308, and a controller 359, of the migration system 306 sends an instruction at 360 to the migration engine service module 326(a) to initiate the migration of the virtual machine from network device 302(a) to network device 302(b).

The migration engine service module 326(a) initiates the migration of the virtual machine by communicating with the migration engine service module of network device 302(b). As a consequence, the virtual machine is migrated from the network device 302(a) to network device 302(b) using known or contemplated virtual machine migration techniques. At 362, the migration system 306 sends a message to the remote challenger 304 that the virtual machine has migrated to network device 302(b). Thus, by receiving this information, the remote challenger 304 can subsequently determine whether or not the virtual machine has successfully migrated and can attest the trustworthiness of the virtual machine, even though it has migrated from network device 302(a) to network device 302(b).

Figure 4:
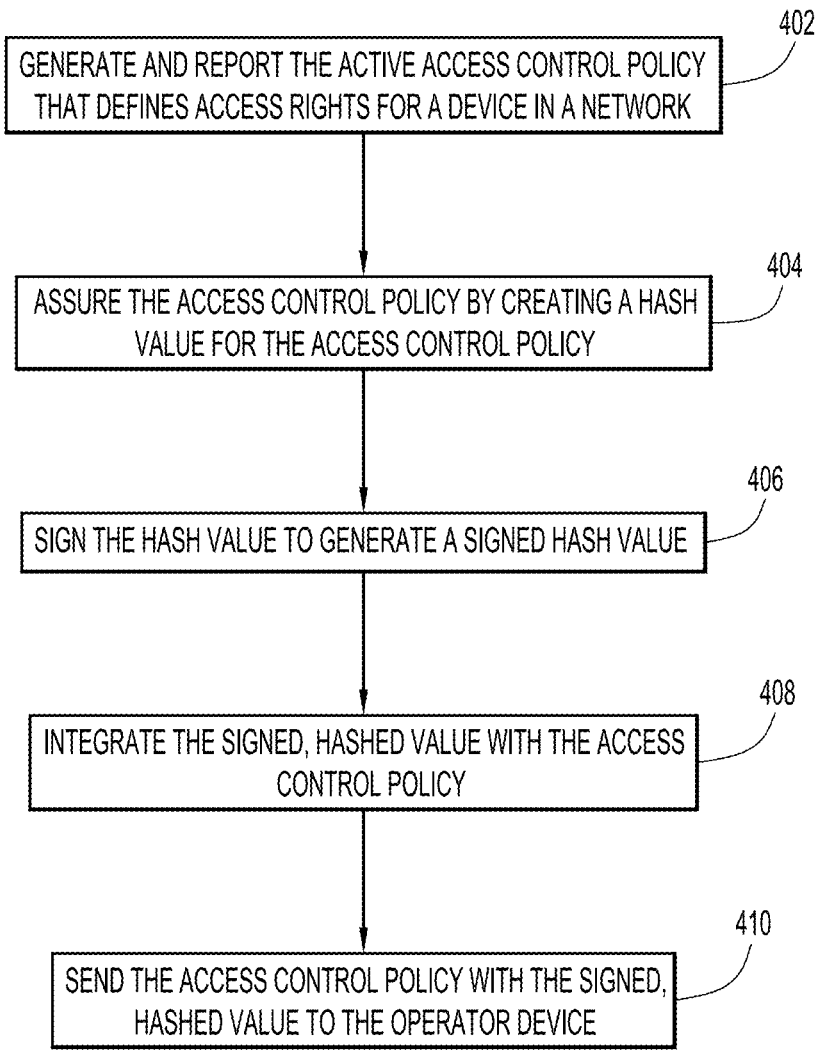
FIG. 4 shows a flow chart depicting operations for verifying the run-time trustworthiness of a device within a secure network, according to an example embodiment.

Reference is now made to FIG. 4, which shows an example flow chart 400 depicting operations for verifying the run-time trustworthiness of a device within a secure network. At operation 402, the security management device 104 generates and reports access control policy that defines access rights for a device in a network. At 404, the security management device 104 assures the access control policy by creating a hash value for the access control policy. The security management device 104, at 406, signs the hash value to generate a signed hash value and at 408 integrates the signed hash value with the access control policy. At 410 the security management device 104 sends the access control policy with the hash value to the operator device.

In general, the techniques described herein extend the boot time measurement and attestation processes to assess the trustworthiness of the system at run-time. For example, the techniques herein involve building upon the trusted anchor technologies employed to verify trust at boot time with run-time remote attestation services that: manage MAC policy evaluation, signatures and certificate attributes that describe policy quality and scope; verify that policies are enforced and have not been modified or disabled; sign security audit logs to maintain integrity using the hardware trust anchor; analyze security policy logs for violations indicates processes attempting to violate security policy; and provide remote attestation services of system trustworthiness.

MAC policies are used as an example herein, though any access policies may be used. In one example, MAC policies are applied to constrain the process execution (including virtual machines), and a kernel of the security management device 104 monitors access attempts by a requestor device. As stated above, the kernel logs any attempted policy violations, and these attempted policy violations by a requestor device may indicate potentially malicious behavior.

The techniques herein extend the trustworthiness of devices in a secure network by using run-time event logging and analysis using signed MAC policies. The techniques herein also involve trust assurance score values that are used together with the signed MAC policies for attestation. For example, the trust assurance score values provide a value that can be compared or evaluated to determine if a system should be allowed to participate in a domain. These values are communicated by entities in software or hardware that provide some level of trust. A hardware root of trust, such as a TPM or some other device, is used to verify and sign the information that is shared with other systems. With no root of trust, it may be impossible to determine if the values are legitimate and can be trusted. In a worst case scenario, a hardware platform may have malware installed and boots an image. Even if the operating system is valid and has mandatory access control policies in place, the system is still compromised and is not secure.

The values for all the integrity components may not be additive. For example, the trust assurance values may be designated as follows: Anti-tamper Anti-counterfeit detection 10%, Hardware root of trust 10%, Secure boot 30%, Running signed applications 20%, MAC policies and enforcement 0-30%.

If a signed image is loaded and MAC policies are enforced, the trust assurance values may still be limited since it is possible to have malware loaded and installed on the operating system of the security management device 104. In one embodiment, the trust assurance values would comprise: Anti-tamper Anti-counterfeit detection+Hardware root of trust+Secure boot+Signed Applications+Approved MAC policies enforced=100%. Without this continuous chain of trust, a system (e.g., the security management device 104) may not be fully trustworthy, and compromise may be possible.

The following is an example of a procedure to use policies to support device trust attestation. In general, the MAC policy (or another access control policy used herein) is developed by the manager server 106 and installed in the security management device 104 for a profile and is verified and scored by a governing authority who manages the policy certificate authority. The policy is hashed and signed by a governing authority, with the policy score included in the certificate field indicating policy applicability and security context information. The signed and hashed policy is then installed onto a provider server database. The production system of the requestor device integrates a hardware root of trust or similar software service. After run-time, the requestor device can interrogate the security management device 104, and the requestor device can determine its trustworthiness.

Upon initial security management device boot-up and requesting to join a network, a domain security controller or registry compares the security score and context for the enabled policies to determine if the device is applying the proper security given its role and host applications to determine if the network device should be granted access to the network. This registration/determination occurs before the device is allowed to participate in the trusted network.

Figure 5:
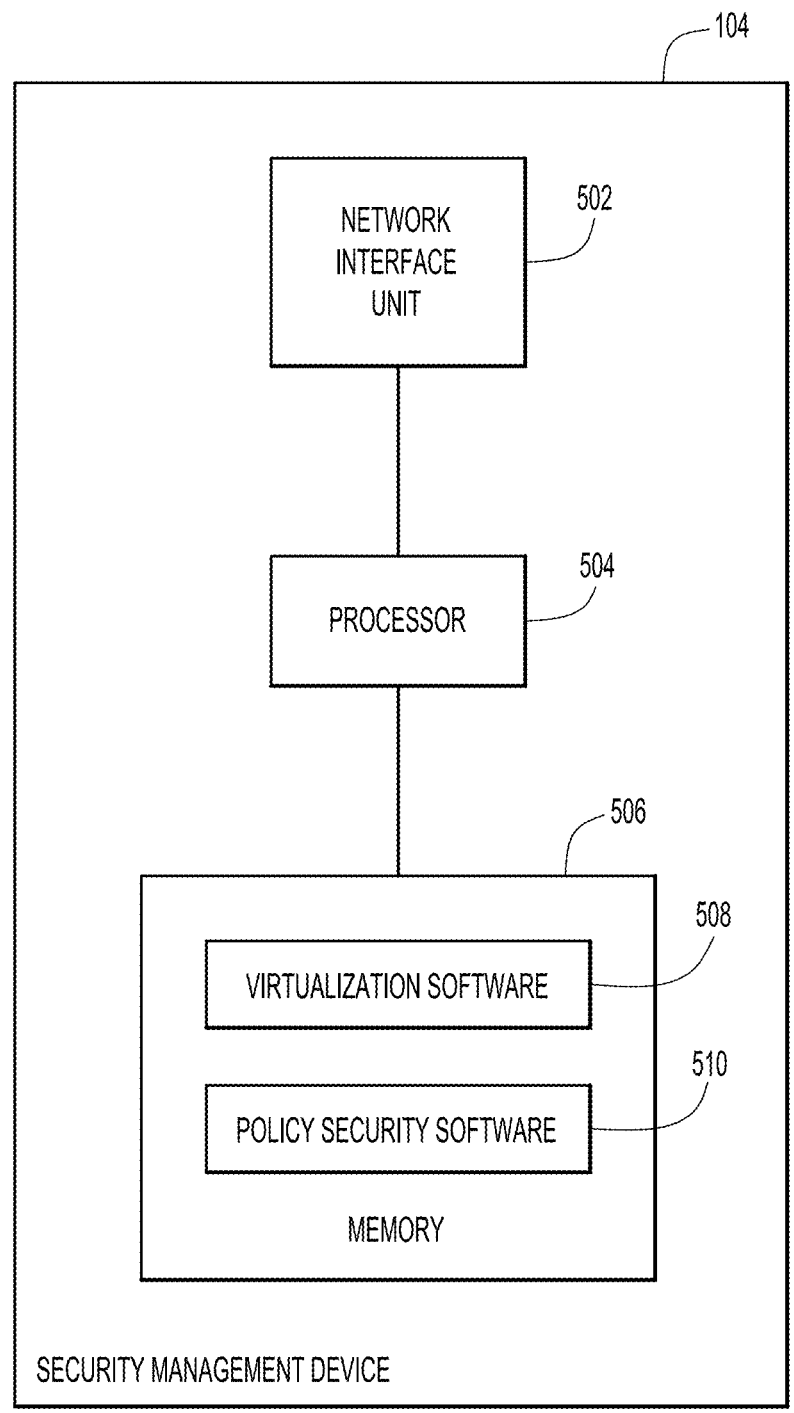
FIG. 5 is a block diagram of a device within the secure network that provides trust attestation information, according to an example embodiment.

Reference is now made to FIG. 5, which shows an example block diagram of the security management device 104. The security management device 104 comprises, among other components, a network interface unit 502, a processor 504 and a memory 506. The network interface unit 502 sends and receives communications (e.g., signed access policies) to devices as described herein. The network interface unit 502 is coupled to the processor 504. The processor 504 is, for example, a microprocessor or microcontroller that is configured to execute program logic instructions (i.e., software) for carrying out various operations and tasks of the security management device 104, as described above. For example, the processor 504 is configured to execute virtualization software 508 and policy security software 510 to provide attestation information to a requestor device, as described by the techniques above. The functions of the processor 504 may be implemented by logic encoded in one or more tangible computer readable storage media or devices (e.g., storage devices compact discs, digital video discs, flash memory drives, etc. and embedded logic such as an application specific integrated circuit, digital signal processor instructions, software that is executed by a processor, etc.).

The memory 506 may comprise read only memory (ROM), random access memory (RAM), magnetic disk storage media devices, optical storage media devices, flash memory devices, electrical, optical, or other physical/tangible (non-transitory) memory storage devices. The memory 506 stores software instructions for the virtualization software 508 and the policy security software 510. Thus, in general, the memory 506 may comprise one or more computer readable storage media (e.g., a memory storage device) encoded with software comprising computer executable instructions and when the software is executed (e.g., by the processor 504) it is operable to perform the operations described for the virtualization software 508 and the policy security software 510.

The virtualization software 508 and the policy security software 510 may take any of a variety of forms, so as to be encoded in one or more tangible computer readable memory media or storage device for execution, such as fixed logic or programmable logic (e.g., software/computer instructions executed by a processor), and the processor 406 may be an ASIC that comprises fixed digital logic, or a combination thereof. In one example, the virtualization software 508 represents executable logic and processes that enables the security management device 104 to host the virtual devices described herein.

For example, the processor 504 may be embodied by digital logic gates in a fixed or programmable digital logic integrated circuit, which digital logic gates are configured to perform the virtualization software 508 and the policy security software 510. In general, the virtualization software 508 and the policy security software 510 may be embodied in one or more computer readable storage media encoded with software comprising computer executable instructions and when the software is executed operable to perform the operations described hereinafter.

It should be appreciated that the techniques described above in connection with all embodiments may be performed by one or more computer readable storage media that is encoded with software comprising computer executable instructions to perform the methods and steps described herein. For example, the operations performed by the security management device 104 and the device 110, remote challenger device 304 or any of the network devices 302(a)-302(d) may be performed by one or more computer or machine readable storage media (non-transitory) or device executed by a processor and comprising software, hardware or a combination of software and hardware to perform the techniques described herein.

In summary, a method is provided comprising: at a security management device configured to perform network trust attestation operations, generating an access control policy that defines access rights for a device in a network; assuring the access control policy by creating a hash value for the access control policy; signing the hash value to generate a signed hash value; integrating the signed hash value with the access control policy; and sending the signed access control policy with the hash value to the operator device.

Furthermore, a computer readable storage medium is provided that is encoded with software comprising computer executable instructions and when the software is executed operable to: generate an access control policy that defines access rights for a device in a network; assure the access control policy by creating a hash value for the access control policy; sign the hash value to generate a signed hash value; integrate the signed hash value with the access control policy; and cause the access control policy with the signed hash value to be sent to the device for verification.

In addition, an apparatus is provided comprising: a network interface unit configured to send and receive communications over a network; and a processor coupled to the network interface unit, and configured to: generate an access control policy that defines access rights for a device in a network; assure the access control policy by creating a hash value for the access control policy; sign the hash value to generate a signed hash value; integrate the signed hash value with the access control policy; and cause the access control policy with the signed hash value to sent the device for verification.

The above description is intended by way of example only. Various modifications and structural changes may be made therein without departing from the scope of the concepts described herein and within the scope and range of equivalents of the claims.

What is claimed is:

1. A method comprising:
   at a security management device in a provider network configured to generate network trust attestation information:
   receiving, from a device external to the provider network, a request to access services in the provider network;
   in response to receiving the request to access the services in the provider network, generating an access control policy that defines access rights for the external device when accessing the services in the provider network;
   assuring the access control policy by creating a hash value for the access control policy in response to receiving the request to access the services;
   signing the hash value to generate a signed hash value;
   integrating the signed hash value with the access control policy; and
   sending the access control policy with the signed hash value to the device external to the provider network for verification, such that the device external to the provider network is configured to compare the signed hash value with an expected hash value associated with the security management device to verify the network trust attestation information to determine whether to access the services in the provider network, wherein the device external to the provider network receives the expected hash value associated with the security management device from a server within the provider network.

2. The method of claim 1, wherein generating comprises:
   generating a mandatory access control policy; and
   determining a trust assurance value associated with the mandatory access control policy.

3. The method of claim 1, wherein sending comprises sending to the device the access control policy with the signed hash value during network run-time such that the device can determine the trustworthiness of the security management device.

4. The method of claim 1, further comprising:
   determining whether the device attempts to obtain access rights beyond the access control policy; and
   flagging the device as a potentially malicious device if the device attempts to obtain access rights beyond the access control policy for a predetermined number of instances.

5. The method of claim 1, wherein signing comprises signing the access control policy by creating a hash value associated with a virtual machine hosted by the security management device.

6. The method of claim 5, wherein sending comprises sending the access control policy with the hash value prior to a migration of the virtual machine in the network.

7. The method of claim 6, wherein sending comprises sending the access control policy with the hash value during the virtual machine migration such that the device can determine whether or not the virtual machine has successfully migrated.

8. The method of claim 1, wherein sending comprises sending the access control policy with the signed hash value during network run-time to enable the device to report trustworthiness of the security management device during provider network run-time.

9. The method of claim 1, wherein the network attestation information is stored in a trusted platform module.

10. A non-transitory computer readable storage media encoded with software comprising computer executable instructions and when the software is executed at a security management device in a provider network, the instructions are operable to:
    generate network trust attestation information;
    receive, from a device external to the provider network, a request to access services in the provider network;
    in response to receiving the request to access the services in the provider network, generate an access control policy that defines access rights for the external device when accessing the services in the provider network, and assure the access control policy by creating a hash value for the access control policy;
    sign the hash value to generate a signed hash value;
    integrate the signed hash value with the access control policy; and
    cause the access control policy with the signed hash value to be sent to the device external to the provider network for verification, such that the device external to the provider network is configured to compare the signed hash value with an expected hash value associated with the security management device to verify the network trust attestation information to determine whether to access the services in the provider network, wherein the device external to the provider network receives the expected hash value associated with the security management device from a server within the provider network.

11. The non-transitory computer readable storage media of claim 10, wherein the instructions operable to generate comprise instructions operable to:
  generate a mandatory access control policy; and
  determine a trust assurance value associated with the mandatory access control policy.

12. The non-transitory computer readable storage media of claim 10, further comprising instructions operable to:
  determine whether the device attempts to obtain access rights beyond the access control policy; and
  flag the device as a potentially malicious device if the device attempts to obtain access rights beyond the access control policy for a predetermined number of instances.

13. The non-transitory computer readable storage media of claim 10, wherein the instructions operable to sign comprise instructions operable to sign the access control policy by creating a hash value associated with a virtual machine hosted by the security management device.

14. The non-transitory computer readable storage media of claim 13, wherein the instructions operable to send comprise instructions operable to send the access control policy with the hash value prior to a migration of the virtual machine in the network.

15. The non-transitory computer readable storage media of claim 10, wherein the instructions operable to generate the signed hash value comprise instructions operable to store the signed hash value in a trusted platform module.

16. An apparatus comprising:
  a network interface unit within a security management device in a provider network configured to send and receive communications over a network; and
  a processor within the security management device coupled to the network interface unit, and configured to:
  generate network trust attestation information;
  receive, from a device external to the provider network, a request to access services in the provider network;
  in response to receiving the request to access the services in the provider network, generate an access control policy that defines access rights for the external device when accessing the services in the provider network, and assure the access control policy by creating a hash value for the access control policy;
  sign the hash value to generate a signed hash value;
  integrate the signed hash value with the access control policy; and
  cause the access control policy with the signed hash value to be sent to the device external to the provider network for verification, such that the device external to the provider network is configured to compare the signed hash value with an expected hash value associated with the security management device to verify the network trust attestation information to determine whether to access the services in the provider network, wherein the device external to the provider network receives the expected hash value associated with the security management device from a server within the provider network.

17. The apparatus of claim 16, wherein the processor is further configured to:
  generate a mandatory access control policy; and
  determine a trust assurance value associated with the mandatory access control policy.

18. The apparatus of claim 16, wherein the processor is further configured to:
  determine whether the device attempts to obtain access rights beyond the access control policy; and
  flag the device as a potentially malicious device if the device attempts to obtain access rights beyond the access control policy for a predetermined number of instances.

19. The apparatus of claim 16, wherein the processor is further configured to sign the access control policy by creating the hash value associated with a virtual machine hosted by the security management device.

20. The apparatus of claim 16, wherein the processor is further configured to store the signed hash value in a trusted platform module.

* * * * *